No. 785,792. Patented March 28, 1905.

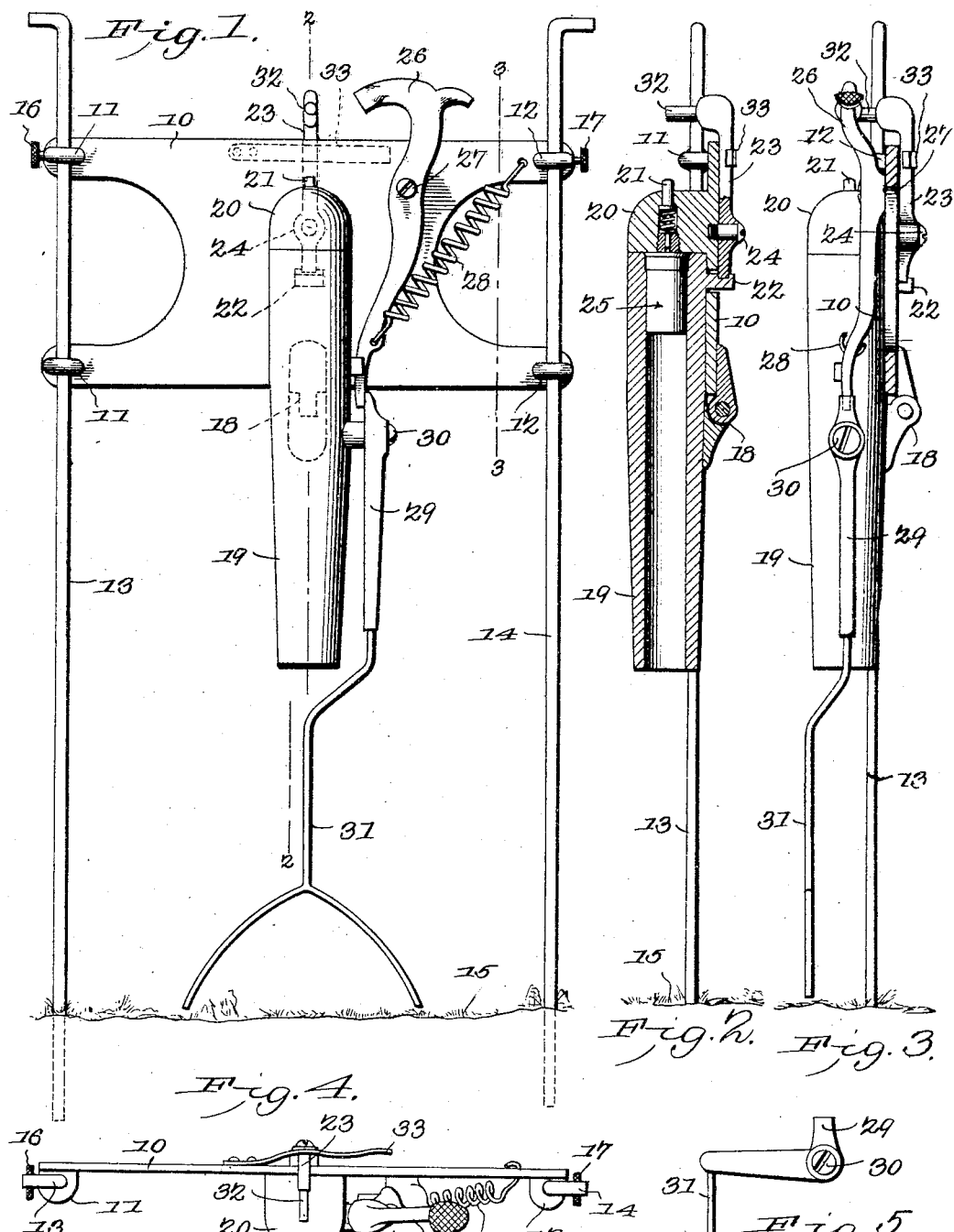

UNITED STATES PATENT OFFICE.

HENRY P. BOGGS, OF MOSIERTOWN, PENNSYLVANIA.

TRAP-GUN.

SPECIFICATION forming part of Letters Patent No. 785,792, dated March 28, 1905.

Application filed August 3, 1904. Serial No. 219,375.

*To all whom it may concern:*

Be it known that I, HENRY P. BOGGS, a citizen of the United States, residing at Mosiertown, in the county of Crawford and State of Pennsylvania, have invented a new and useful Trap-Gun, of which the following is a specification.

This invention relates to trap-guns for killing noxious animals, and has for its object to simplify and improve the construction and produce a device of this character which may be set at the entrances to the burrows or holes of the animals to be destroyed, above the runways either above or below the ground, or other localities frequented by them, and which may be adjusted to the size of the animals or to adapt it to the locality frequented by them.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a front elevation. Fig. 2 is a sectional elevation on the line 2 2 of Fig. 1. Fig. 3 is a side elevation, with the frame in section, on the line 3 3 of Fig. 1. Fig. 4 is a plan view. Fig. 5 is a detail of the trigger member, illustrating a slight modification in the construction.

The improved device comprises a supporting frame or plate 10, having perforated lugs 11 12 at the ends to receive the leg members 13 14, adapted to be thrust into the ground (indicated at 15) and adjustable upon the leg members, as by set-screws 16 17, so that the frame may be adjusted to any required extent relative to the ground.

Hinged, as at 18, to the frame 10 for swinging beneath the same is a gun-barrel 19, and attached to or formed integral with the frame is a breech-block 20, with which the barrel engages when swung into vertical position, the breech-block having a spring-controlled firing-pin 21. The barrel 19 is provided with a notched pin 22 for passing through an aperture in the frame 10 and engaged by a button or similar device 23, pivoted at 24 to hold it detachably in operative position. By this arrangement when the cartridge (indicated at 25) is to be inserted the button will be released, the gun swung outward, the cartridge inserted, and the gun returned to its former position. A holding-spring 33 may be provided, if required, to hold the member 23 from accidental displacement.

The hammer is represented at 26 and pivoted at 27 to the frame 10 and provided with a spring 28 for throwing it into engagement with the firing-pin. A trigger 29 is pivoted at 30 to the barrel 19 for engaging the lower end of the hammer and holding it poised ready to strike when released.

A trip-arm 31 extends from the trigger 29 for projection into the path of the animal to be trapped or destroyed and will preferably be forked to offer a more complete bridge, beneath which the animal will be forced to pass, and thereby displace the trigger and release the hammer. The trip member will be so placed that the animal will be forced to pass beneath the muzzle of the gun when engaging the trip member, and thus be in position to receive the charge from the gun.

The button member 23 is provided with a lateral lug 32, so positioned that when the button is moved to one side the lug will pass beneath the hammer 26 and lock it from action, so that no danger will exist of premature discharge of the gun-barrel.

When the implement is to be operated, it is charged, as before described, and the leg members 13 14 thrust into the ground, with the muzzle of the barrel 19 pointing into the hole or burrow of the animal or above the runway of the same, and the trip member likewise adjusted, so that the animal will be compelled to engage the same and release the trigger in entering or leaving the burrow or passing the runway in either direction. It is obvious that the frame may thus be adjusted to any required extent to adapt the device to all sizes or species of animals which it is desired to destroy and also to adapt it to all the various forms and conditions of the burrows, holes, runways, and the like used by the various animals.

The device may be of any size or of any suitable material.

Having thus described the invention, what is claimed is—

1. In a trap-gun, a supporting-frame carrying a breech-block with a firing-pin therein, a gun-barrel mounted to swing upon said frame for position into engagement with said breech-block, means carried by said frame for detachably locking said barrel in operative position relative to said breech-block, a hammer-spring supported in position to strike said firing-pin, a trigger pivoted upon said barrel for holding said hammer in poised position, and trip members extending from said trigger into the path of the animal to be trapped.

2. In a trap-gun, a supporting-frame carrying a breech-block with a firing-pin therein, a gun-barrel mounted to swing upon said frame for position into engagement with said breech-block, a hammer-spring supported in position to strike said firing-pin, a trigger detachably engaging said hammer for holding the same in poised position, trip members extending from said trigger, and means for adjustably supporting said frame whereby the same may be adjusted to cause said trip members to extend into the path of the animal to be trapped.

3. In a trap-gun, a supporting-frame having means for adjustment relative to the ground, a gun-barrel carried by said frame, a hammer in position to actuate the firing means in said barrel, and trip means connected to said hammer-actuating means and adjustable with said frame.

4. In a trap-gun, a supporting-frame having means for adjustment relative to the ground, a gun-barrel carried by said frame, a hammer in position to actuate the firing means in said barrel, trip means connected to said hammer-actuating means and adjustable with said frame, and a stop member movable upon said frame for projection into the path of said hammer for locking the same in poised position.

5. In a trap-gun, a supporting-frame having means for adjustment relative to the ground, a gun-barrel carried by said frame, a hammer pivoted to said frame in position to engage the firing means of said gun-barrel, a spring connected to operate said hammer, a trigger connected to hold said hammer in poised position and having trip means extending therefrom into the path of the animal to be trapped.

6. In a trap-gun, a supporting-frame having spaced perforated lugs, leg members movably disposed in said lugs and held therein adjustably as by set-screws, a gun-barrel hinged to said frame for engagement with a breech-block upon said frame, said breech-block having the charge-firing means, a hammer-spring supported in position for striking said firing means when depressed, a trigger pivoted in position to engage said hammer and hold it poised and with trip members extending therefrom into the path of the animal to be trapped.

In testimony that I claim the foregoing as my own I have hereto affixed my signature in the presence of two witnesses.

HENRY P. BOGGS.

Witnesses:
O. CLARE KENT,
JOSHUA DOUGLASS.